United States Patent [19]

Dalal

[11] Patent Number: 4,718,004
[45] Date of Patent: Jan. 5, 1988

[54] SAMPLE DATA ACQUISITION SYSTEM USING MICROPROCESSOR CONTROLLED SEQUENCE HAVING FIFO BUFFER, DAM CONTROLLER

[75] Inventor: Samir K. Dalal, Monument, Colo.

[73] Assignee: Honeywell Inc., Minneapolis, Minn.

[21] Appl. No.: 705,164

[22] Filed: Feb. 25, 1985

[51] Int. Cl.⁴ .................................................. G06F 3/05
[52] U.S. Cl. ..................................... 364/200; 364/178; 364/580
[58] Field of Search ... 364/200 MS File, 900 MS File, 364/178, 550, 554, 580; 324/312

[56] References Cited

U.S. PATENT DOCUMENTS

| | | | |
|---|---|---|---|
| 3,905,025 | 9/1975 | Davis | 364/200 |
| 4,021,649 | 5/1977 | Fort | 364/900 |
| 4,137,562 | 1/1979 | Boeck et al. | 364/200 |
| 4,191,919 | 3/1980 | Haney | 324/312 |
| 4,375,676 | 3/1983 | Berkowitz | 364/900 |
| 4,514,822 | 4/1985 | Schneider | 364/900 |

Primary Examiner—Archie E. Williams, Jr.
Assistant Examiner—Emily Y. Chan
Attorney, Agent, or Firm—Charles L. Rubow

[57] ABSTRACT

A data acquisition system includes a microprocessor and a sequencer. The sequencer includes a microengine which when conditioned by the microprocessor affects the transfer of analog sampled digitized data from a signal conditioner to a global random access memory. The microprocessor may interrupt the microengine to read selected digitized data.

2 Claims, 3 Drawing Figures

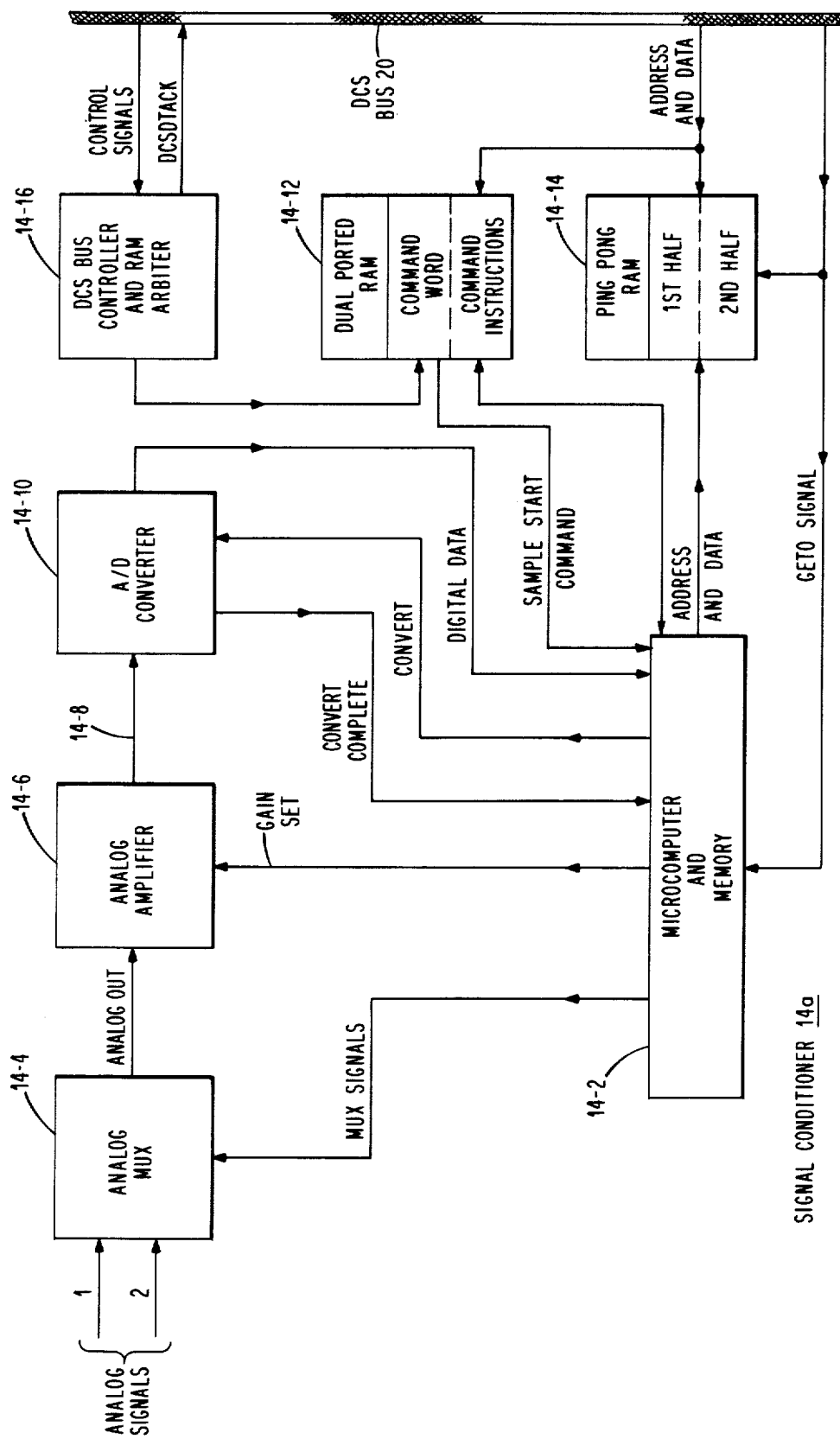

SAMPLE DATA ACQUISITION SYSTEM USING MICROPROCESSOR CONTROLLED SEQUENCE HAVING FIFO BUFFER, DAM CONTROLLER

BACKGROUND OF THE INVENTION

1. Field of the Invention

The invention relates generally to the acquisition of data for analysis and control, and more specifically to a microprocessor controlled data acquisition system using a sequencer for the high speed collection of digitized data words obtained by sampling a number of analog signals.

2. Description of the Prior Art

Data acquisition systems are coupled to devices by signal lines carrying analog signals. The data acquisition systems sample the analog signals at a predetermined rate to generate a digital value of the analog signal at the time of sampling. The digital value may represent some variable, typically amplitude or frequency.

The amplitude analog signals may represent temperature or pressure velocity or even light intensity, or the analog signal representing frequency may represent vibration.

The typical data collection system may sample and analyze these signals for a number of reasons. The system may monitor the temperature of a chemical reaction to determine if safe limits are being exceeded or if the next stage of the process should be initiated. The system may monitor the change in velocity of a test crash of a vehicle to gather data to plan a better bumper design. The system may monitor the frequency of vibrations of a machine to anticipate failure. The system may monitor temperature and humidity to keep a factory within certain prescribed limits. The system may measure low light intensity varies with time as a flash bulb is used in photography.

As can be seen from these typical examples, the sampling times may vary between seconds and microseconds.

Typical systems for data acquisition used commercial microprocessors for controlling the data transfer between the analog-to-digital conversions, and the storage of the digitized data words for processing. As the need for higher speed sampling of a greater number of analog signal lines, bit slice microprocessors were designed into the data acquisition systems. Bit slice microprocessors will process the transfer of data faster than the commercial microprocessors previously used.

The bit slice microprocessor approach, however, has the limitation of being inflexible in responding to changing needs. As test conditions change on the fly, a considerable amount of software is required to adapt to the new conditions. This requires excessive time to change parameters as well as additional memory space for storing software. In addition, new conditions that must be met require that new software be written, thereby making the data acquisition not readily accessible in real time.

OBJECTS OF THE INVENTION

Accordingly, it is an object of the invention to provide an improved data acquisition system.

It is another object of the invention to provide a data acquisition system having improved flexibility in changing parameters on the fly.

It is yet another object of the invention to provide a data acquisition system with improved data acquisition capabilities having a microprocessor controlled sequencer.

It is still another object of the invention to provide a data acquisition system using both a microprocessor and a sequencer sharing the transfer of digitized data words from an analog signal digitizer to a global memory.

It is also another object of the invention to provide a data acquisition system including a microengine with a scan table memory for generating address information, a stop signal or a link signal for controlling the data collection operation.

It is yet another object of the invention to provide a data acquisition system having a group of signal conditions responsive to a sampling signal.

SUMMARY OF THE INVENTION

A data acquisition system includes a number of signal conditioners, each receiving a number of analog signals. A GET TIMER 58 generates sampling signals at predetermined frequencies, one frequency for each or a group of signal conditioners. The group of signal conditioners responsive to the same GET signal is known as a scan group. The signal conditioner upon receiving its sampling signal samples each analog signal coupled to it and generates a digitized value representative of the variable being sampled for storage in a ping-pong RAM.

A microengine 29 sends address information to the signal conditioners for addressing a memory location in the ping-pong memory of the selected signal conditioner for transferring the digitized data to a global RAM subsystem 52 for further processing.

The microengine 29 is initialized by a processor (MPU) 2 loading a scan table RAM 40 with signal conditioner ping-pong RAM addresses and loading a 4×12 RAM with scan table memory starting addresses for each GET signal or scan group.

The digitized data transfer is initialized by the sampling signals (GET0 through GET3) being applied to its signal conditioner and to an interrupt vector 60. The signal conditioner samples its analog signals, digitizes the sample and stores the digitized value in the ping-pong RAM.

The MPU 2 is responsive to the interrupt vector 60 to generate coded signals which are applied to a microengine control 20 to generate signals to select a starting address from the 4×12 RAM and apply it to a counter 30. The starting address will select a location in the scan table RAM 40 which stores the ping-pong RAM location of the next digitized word. The digitized word is read into a data first in-first out (FIFO) memory 34 and then to the global RAM subsystem 52 at an address specified by a direct memory access controller (DMAC) 46.

Each successive address read from the counter 30 is stored into the 4×12 RAM 28 as it addresses the scan table RAM 40. If the MPU 2 interrupts the data transfer between the signal generator ping-pong RAM and the global RAM subsystem 52, the 4×12 RAM 28 stores the next scan line table address to allow the microengine to continue where it left off before the MPU 2 interruption. The MPU 2 may interrupt the microengine 29 in order to address a particular signal conditioner in order to transfer the selected digitized data word to global RAM subsystem 52.

A stop signal read from the scan table RAM 40 location indicates when the digitized data transfer from the ping-pong RAM is complete. A link signal indicates that the scan table RAM 40 location contains a scan table RAM address. This allows the MPU 2 to indicate to the microengine 29 which digitized values of the analog signals are to be sampled by branching to selected scan table RAM 40 locations.

Other scan table RAM 40 signals identify to the DMAC 46 via channel FIFO 35 which signal conditioner is supplying the digitized word thereby enabling the global RAM subsystem 52 to organize the digitized words by blocks.

BRIEF DESCRIPTION OF THE DRAWINGS

The novel features which are characteristic of the invention are set forth with particularity in the appended claims. The invention itself, however, both as to organization and operation may best be understood by reference to the following description in conjunction with the drawings in which:

FIG. 3 is a block diagram of a typical signal conditioner.

DESCRIPTION OF THE PREFERRED EMBODIMENT

Figure 1:
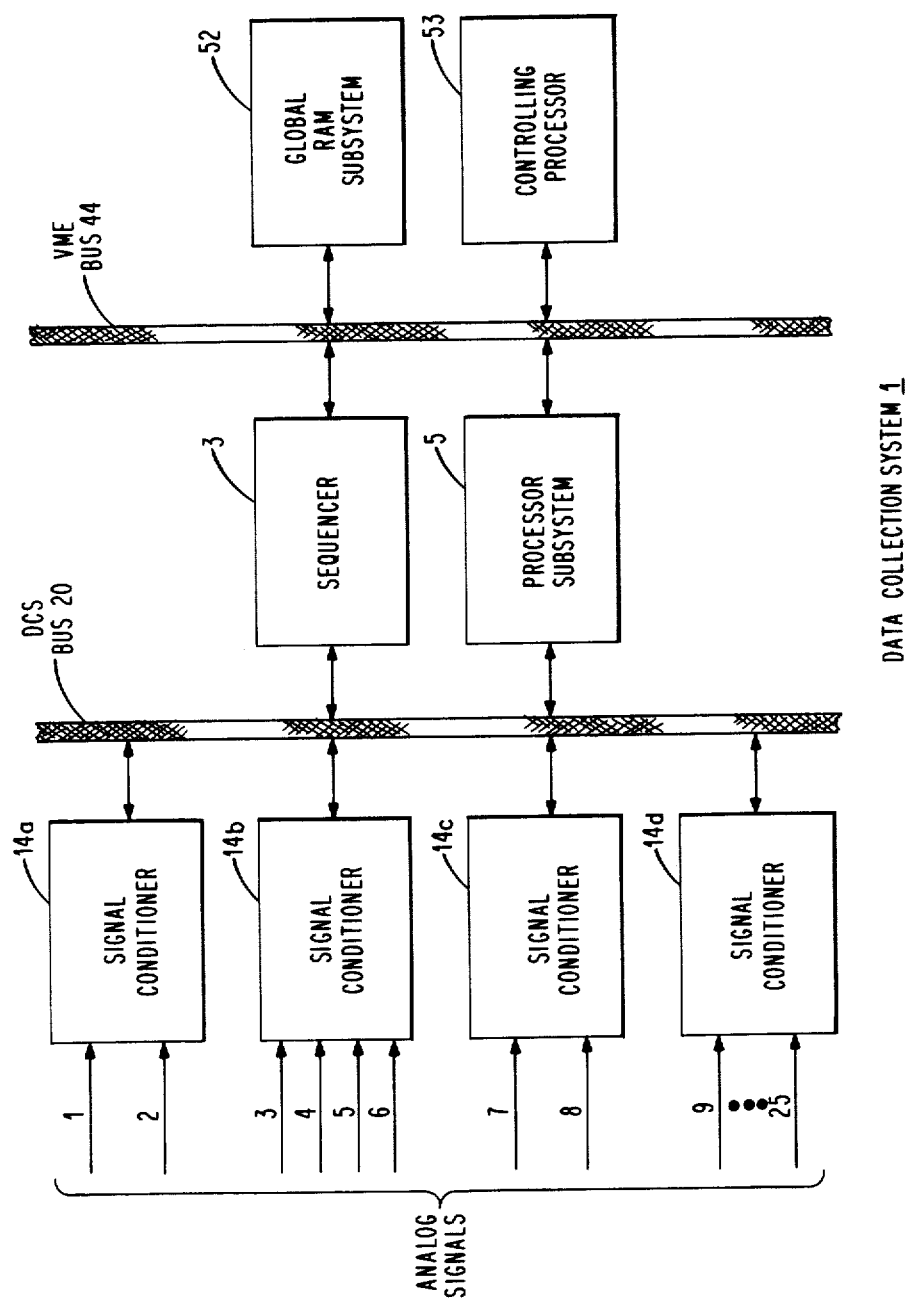
FIG. 1 is an overall block diagram of the data collection system.

Referring to FIG. 1, a data collection system 1 includes typically four signal conditioners 14a, 14b, 14c and 14d; a processor subsystem 5; a sequencer 3; a global RAM subsystem 52 and a system controlling processor 53.

In the preferred embodiment, analog signals 1 through analog signals 25 are received by their signal conditioners 14a, 14b, 14c and 14d, respectively. Processor subsystem 5 generates sampling signals at predetermined frequencies which are applied to their assigned signal conditioners 14a, 14b, 14c and 14d. The sampled value of the analog signals are digitized by their respective signal conditioners 14a, 14b, 14c and 14d and applied to the sequencer 3 which under control of processor subsystem 5 transfers the digitized data signals for storage in the global RAM subsystem 52.

In addition the signal conditioners 14a, 14b, 14c and 14d may apply the digitized data signals to the processor subsystem 5 for transfer to global RAM subsystem 52.

The sequencer 3 and processor subsystem 5 are coupled to the signal conditioners 14a, 14b, 14c and 14d by a data collection (DCS) bus 20 and to the global RAM subsystem 52 by a VME bus 44. Also coupled to the VME bus 44 is the controlling processor 53 which analyzes the digitized data stored in the global RAM subsystem 52. The controlling processor 53 also initializes the sequencer 3 and the processor subsystem 5 during a power up sequence.

Figure 2:
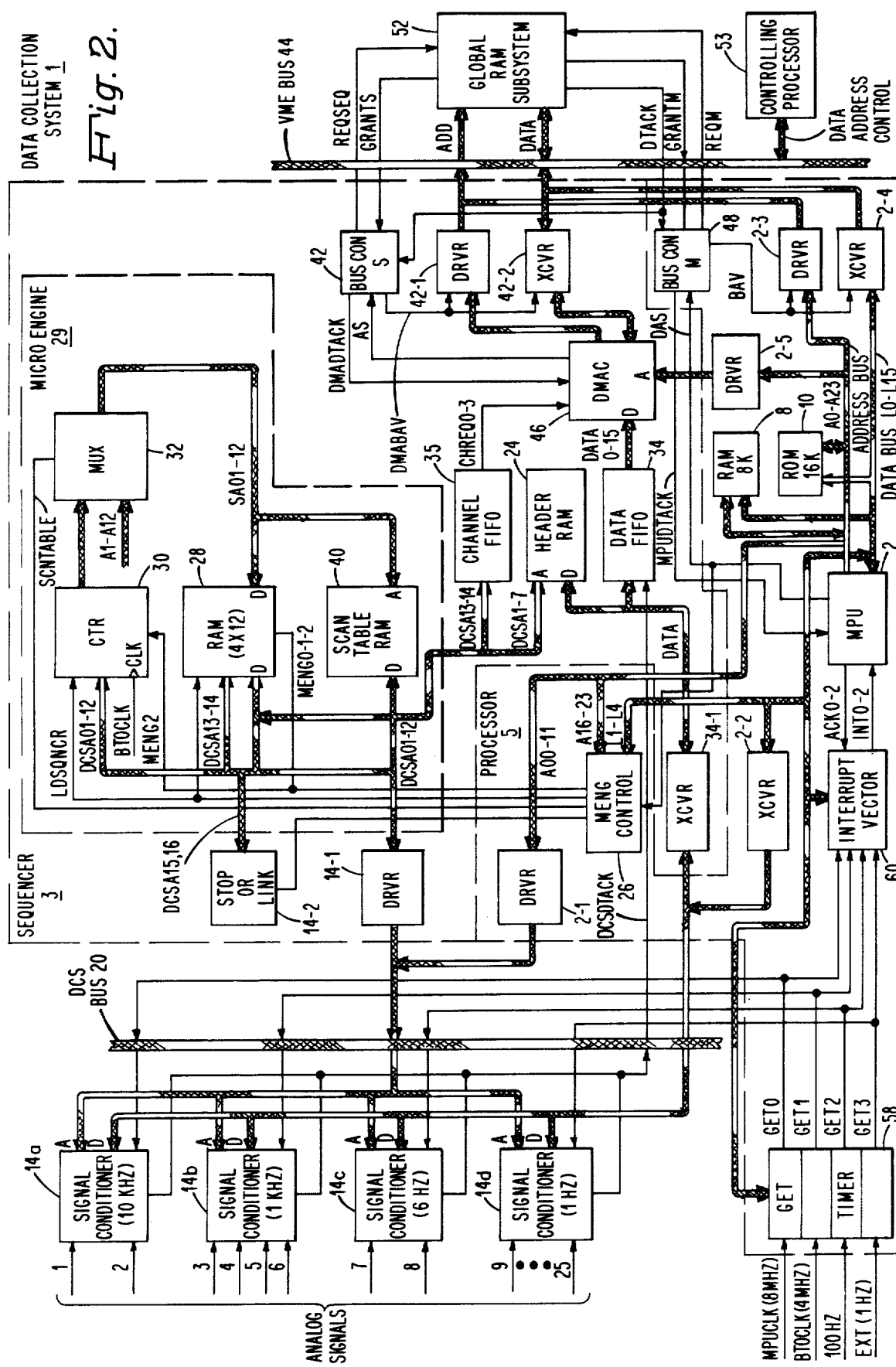
FIG. 2 is a detailed block diagram of the data collection system.

Referring to FIG. 2, the processor subsystem 5 includes a GET TIMER 58 which generates a GET0 signal at a 100 microsecond rate, a GET1 signal at a one millisecond rate, a GET2 signal at a 1/6 second rate and a GET3 signal at a one second rate. The GET0 signal is generated by an 8 MHz MPUCLK signal which counts down a first predetermined value stored in GET TIMER 58. The GET1 signal is generated by a 4 MHz BTOCLK signal counting down a second predetermined value. The GET2 signal is generated by a 100 Hz signal counting down a third predetermined value and the GET3 signal is generated by an externally applied signal counting down a fourth predetermined value. The four predetermined values are stored in GET TIMER 58 during the initialization sequence.

The GET0 signal applied to signal conditioner 14a samples analog signals 1 and 2 every 100 microseconds. The GET1 signal applied to signal conditioner 14b samples analog signals 3, 4, 5 and 6 every millisecond. The GET2 signal applied to signal conditioner 14c samples analog signals 7 and 8 every 1/6 seconds and the GET3 signal applied to signal conditioner 14d samples analog signals 9 through 25 every second.

Referring to FIG. 3, signal conditioner 14a logic blocks are shown. Since signal conditioners 14b, 14c and 14d operate in a similar manner to signal conditioner 14a, only signal conditioner 14a is described.

Each signal conditioner 14a, 14b, 14c and 14d samples a number of analog signals 14-8 coupled to it at a rate determined by the GET0, GET1, GET2 or GET3 signal received from the GET TIMER 58.

A microcomputer and memory 14-2 receives the GET0 signal and generates a multiplexer (MUX) select signal which is applied to an analog MUX 14-4 to select one of the two analog signals. The selected analog signal is applied to an analog amplifier 14-6 which amplifies the signal in accordance with the GAIN SET signal previously received from microcomputer and memory 14-2.

An A/D converter 14-10 receives the amplified analog signal 14-8 and converts it to a 16 binary bit digital data word when the A/D converter 14-10 receives the CONVERT signal from the microcomputer and memory 14-2.

The A/D converter 14-10 sends a CONVERT COMPLETE signal to condition the microcomputer and memory 14-2 to receive the digital data and to select analog signal 2 via the MUX 14-4. The microcomputer and memory 14-2 also stores the digital data word at a specified location in ping-pong RAM 14-14.

The ping-pong RAM 14-14 is organized in two halves. The digital data word received by the microcomputer and memory 14-2 is stored in a location in one half of ping-pong RAM 14-14 in response to a first occurrence of the GET0 signal and stored in a location in a second half on a subsequent occurrence of the GET0 signal. This permits the sequencer 3 or the microprocessor (MPU) 2 to read the previous 16 bit data word from the location in one half of the ping-pong memory 14-14 while the microcomputer and memory 14-2 is storing the 16 bit data word in the other half of the ping-pong memory 14-14.

A dual-ported RAM 14-12 stores a command word and command instructions. The microcomputer and memory 14-2 periodically checks the command word and performs indicated commands by means of the command instructions stored in the RAM 14-12. The microprocessor 2 sets up the gain and other parameters via the command word and command instructions which issue a sample start command. The microcomputer and memory 14-2 is responsive to the sample start command to test for the GET0 signal to initiate the sampling sequence.

A DCS bus controller and RAM arbiter 14-16 provides control for coupling either the sequencer 3 or the microprocessor 2 to the signal conditioner 14a via the DCS bus 20.

The sequencer 3 is initialized as a part of a Power Up sequence by the controlling processor 53 loading the global RAM subsystem 52 with information. The MPU 2 addresses the information to load the memories in a microengine 29 in sequencer 3. A scan table memory (RAM) 40 is loaded in four sections. Each section is associated with a particular signal conditioner 14a, 14b, 14c or 14d. Each section is loaded in successive locations with a header RAM 24 address followed by the addresses of the ping-pong RAM 14-14 locations storing the digitized data word representing the sampled analog signals. As an example, the section in scan table RAM 24 associated with signal conditioner 14a will store three addresses, the header RAM 24 address and the two addresses in ping-pong RAM 14-14 storing the analog signal 1 and analog signal 2 sampled digitized values.

The header RAM 24 receives four 16-bit data words, one data word providing the header information for each signal conditioner 14a, 14b, 14c and 14d, respectively.

A 4×12 RAM 28 receives the starting scan table RAM 40 address minus one for each of the four sections associated with the respective signal conditioner 14a, 14b, 14c and 14d.

A direct memory access controller (DMAC) 46 receives the addresses it sends to the global RAM subsystem 52 for storing the digitized data words of the sampled analog signals.

An interrupt vector 60 receives the order of priority of the GET signals with the GETo signal receiving the highest priority and the GET3 signal receiving the lowest priority.

The GET TIMER 58 receives the first, second, third and fourth predetermined values, one for each of the timers to generate the specified timing of the GET0, GET1, GET2 and GET3 signals from their respective MPUCLK, BTOCLK, 100 HZ and EXT signals when the GET TIMER 58 counts down the predetermined values.

Each signal conditioner 14a, 14b, 14c and 14d receives the appropriate command word and command microinstructions which are stored in their respective dual-ported RAM 14-12.

The data collection system is started by the GET TIMER 58 generating one or more of the GET0, GET1, GET2 or GET3 signals which are applied to start their respective signal conditioners 14a, 14b, 14c and 14d to sample the analog signals and store the digitized values in their respective ping-pong RAM's 14-14.

The GET0, GET1, GET2 and GET3 signals are also applied to interrupt vector 60 which in turn applies signals INT0, INT1 and INT2 to MPU 2. Signals INT0, INT1 and INT2 are coded to indicate the highest priority GET signal requesting access to the sequencer 3 since more than one GET signal may be active at the same time. MPU 2 acknowledges the receipt of the highest priority signal by generating the acknowledge signals ACK0, ACK1 and ACK2, coded to indicate the GET signal that is being processed.

MPU 2 starts the sequencer 3 by branching to a routine in accordance with the program and microprograms stored in a RAM 8 and a ROM 10. The MPU 2, as a consequence of executing the start routine, generates address bus signals A16 through A23 and data bus signals L1 through L6 which are applied to a microengine control 26 to generate signals MENG0, MENG1 and MENG2 which are in turn applied to 4×12 RAM 28. Signals MENG0 and MENG1 select the one of four address locations associated with the highest priority GET signal selected by MPU 2 from interrupt vector 60. Signal MENG2 initiates a read operation. One less than the starting scan table RAM 40 address associated with the highest priority GET0, GET1, GET2 or GET3 signal is loaded into a counter 30 which is conditioned by a load sequencer signal LDSQNCR. The counter 30 increments the address to the starting address and the output count representing a scan table RAM 40 location is applied from counter 30 via a multiplexer (MUX) 32 to the scan table RAM 40 as signals SA01 through SA12. The MUX 32 is conditioned to receive the address by a signal SCNTABLE from MENG control 26. Once loaded, counter 30 is incremented on each BTOCLK clock signal.

Scan table RAM 40 first generates the header RAM 24 address DCSA1 through DCSA7 to read the header data word into a data FIFO 34. Counter 30 then applies the next address signals SA01 through SA12 to scan table RAM 40 to generate the signal conditioner 14a, 14b, 14c or 14d and ping-pong RAM 14-14 addresses DCSA01 through DCSA12 via a driver 14-1. The data stored in the addressed location of ping-pong RAM 14-14 is strobed in data FIFO 34 by signal DCSDTACK. The data was received via a transceiver (XCVR) 34-1. This operation is continued until all the digitized data words are read into data FIFO 34 from ping-pong RAM 14-14 in response to the highest priority GET signal.

Signals DCSA13 and DCSA14 are also applied to a channel FIFO 35, decoded and read out to the DMAC 46 as signals CHREQ0 through CHREQ3. This indicates which signal conditioner's 14a, 14b, 14c or 14d digitized data words are processed by data FIFO 34 and in turn the DMAC 46. The DMAC 46 organizes the digitized data in the global RAM subsystem 52 by block in accordance with the signal conditioner 14a, 14b, 14c or 14d digitized data words received.

The address signals SA01 through SA12 are stored in 4×12 RAM 28 each cycle at an address specified by signals DCSA13 and DCSA14. This enables the microengine 29 to restart after a higher priority signal conditioner 14a, 14b or 14c requested and was serviced. The MPU 2 interrupts the microengine 29 to process the higher priority request. MPU 2 interrupts the lower priority digitized data word transfer by applying address signals A16 through A23 and data signals L1 through L4 to MENG control 26 to generate signals MENG0, MENG1 and LDSQNCR. Signals MENG0 and MENG1 select the scan table RAM 40 starting address minus one of the higher priority from 4×12 RAM 28 which is loaded into counter 30 under control of the load sequencer signal LDSQNCR. Counter 30 increments the starting address minus one and applies the starting address to scan table RAM 40 for reading out the header RAM 24 address. The microengine 29 then returns to process the prior request by reading out the previously stored address from 4×12 RAM 28 into counter 30.

The DCSA15 signal from the scan table RAM 40 indicates that this is the end of the microengine 29-signal conditioner 14a, 14b, 14c or 14d processing cycle for this GET0, GET1, GET2 or GET3 sequence. Signal DCSA15 is applied to stop or link logic 14-2 which applies a STOP signal to MENG control 26 in order to activate the next highest priority digitized data word transfer.

The DCSA16 signal from the scan table RAM 40 indicates that the scan table RAM 40 will branch to the address specified by signals DCSA01 through DCSA12 for that data word. The DCSA16 signal is applied to stop or link logic 14-2 which applies a link signal LINK to MENG control 26 to generate the LDSQNCR signal. This results in signals DCSA01 through DCSA12 being stored in counter 30 and 4×12 RAM 28 to address the next scan table RAM 40 location.

DMAC 46 requests the VME bus 44 by generating an address strobe signal AS indicating that the DMAC 46 has data to transfer to the global RAM subsystem 52. A bus requester BUSCON S 42 receives the AS signal and requests the VME bus 44 by generating an REQSEQ signal. The global RAM subsystem 52 grants access to the bus by generating a GRANTS signal which is applied to BUSCON S 42 which in turn generates a DMABAV signal which activates a driver 42-1 for transferring address information and a XCVR 42-2 for transferring the digitized data word to global RAM subsystem 52 via the VME bus 44.

The MPU 2 may perform the same functions as the microengine 29 by generating signal conditioner 14a, 14b, 14c or 14d address signals in response to its GET0, GET1, GET2 or GET3 signal received through interrupt vector 60. The address bus signals A00 through A11 are applied to the signal conditioner 14a, 14b, 14c or 14d via a driver 2-1 and the DCS bus 20. The digitized data words are received via DCS bus 20, a XCVR 2-2 and the data bus. The MPU 2 stores the digitized data words in the RAM 8 and generates an address enable signal DAS which is applied to a bus requester BUSCON M 48. BUSCON M 48 in turn requests the VME bus 44 by generating signal REQM to global RAM subsystem 52. Global RAM subsystem 52 responds with the GRANTM signal to BUSCON M 48 which applied a BAV signal to activate a driver 2-3 and a XCVR 2-4 thereby enabling the global RAM subsystem 52 to write the digitized data word at the specified location.

The global RAM subsystem 52 responds with a data acknowledge signal DTACK which is applied to both BUSCON S 42 and BUSCON M 48 to indicate that the data transfer is completed. If bus controller BUSCON S 42 was granted access to global RAM subsystem 52, it generates a DMADTACK signal which is received by the DMAC 46. The DMAC 46 may then send the next digitized data word and address to global RAM subsystem 52 via the VME bus 44. Similarly BUSCON M 48 generates an MPUDTACK signal to indicate to MPU 2 that the digitized data word and address information was received if the BUSCON M 48 was granted access to the VME bus 44.

Following are the boolean expressions for the signals which are generated by the MENG control 26 to control the microengine 29:

$$SCNTABLE = A16 \cdot \overline{A17} \cdot A18 \cdot \overline{A19} \, (DAS \cdot A20 \cdot A21 \cdot A22 \cdot A23)$$

$$LDSQNCR = \overline{A16} \cdot \overline{A17} \cdot \overline{A18} \cdot A19 \, (DAS \cdot A20 \cdot A21 \cdot A22 \cdot A23) + LINK + STOP$$

$$SEQNCTRL = A16 \cdot A17 \cdot \overline{A18} \cdot A19 \, (DAS \cdot A20 \cdot A21 \cdot A22 \cdot A23)$$

PRIORITY 1 = SEQCNTRL · L1
PRIORITY 2 = SEQCNTRL · L2
PRIORITY 3 = SEQCNTRL · L3

-continued

PRIORITY 4 = SEQCNTRL · L4
MENG2 = (PRIORITY 1 + PRIORITY 2 + PRIORITY 3 + PRIORITY 4)

MENGO and MENG1 decode the highest priority GET signal requesting access to the sequencer 3 after a STOP signal indicating that the previous GET signal request has been honored and reset that priority request.

The PRIORITY 1, PRIORITY 2, PRIORITY 3 and PRIORITY 4 signals may be the output of their respective flip-flops, typically 74LS112 logic elements, which may be applied to their respective input terminals of a priority encoder 74LS148 logic element to generate signals MENGO, MENG1 and MENG2. Signals MENGO and MENG1 identify the highest priority signal being applied to the priority encoder. Note that the flip-flops and priority encoder are not included in the drawings.

During initialization the DMAC 46 is coupled to the address bus via a driver 2-5. Address bus signals A1 through A12 are applied to MUX 32 to initialize the scan table RAM 40, the 4×12 RAM 28 and the header RAM 24. Both the interrupt vector 60 and the GET TIMER 58 are coupled to the data bus during initialization.

In the microengine 29, counter 30 is made up of three 74LS161A logic elements, 4x12 RAM 28 is made up of three 74LS670 memories, scan table RAM 40 is made up of two and the header RAM 24 is made up of one Fujitsu 8128 RAM's. The MUX 32 is made up of three 74F157 logic elements.

The MPU 2 is a Motorola 68000 microprocessor. The DMAC 46 is a Hiatachi HD68450 controller. The data FIFO 34 is made up of four and the channel FIFO 35 is made up of one Monolithic Memory C67401 logic elements. The BUSCON S 42 and the BUSCON M 48 are Signetics 8×821 bus controllers. The interrupt vector 60 is a Signetics 8×824 interrupt handler. The GET TIMER 58 is made up of two Intel 8254-2 programmable interval timers. The drivers are 74LS241 logic elements and the XCVR's are 74LS245 logic elements.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A data acquisition system comprising:
   timing means for generating a plurality of timing signals;
   a plurality of signal conditioner means coupled to said timing means, each of said plurality of signal conditioner means receiving a plurality of analog signals and being responsive to one of said plurality of timing signals for sampling each of said plurality of analog signals at the rate determined by said one of said plurality of timing signals and generating digitized data words representative of the sampled value of said each of said analog signals;
   interrupt means coupled to said timing means and responsive to said timing signals for generating first coded interrupt signals indicating a highest priority of said plurality of signal conditioner means requiring service;
microprocessor means coupled to said interrupt means and responsive to said first coded interrupt signals for generating a plurality of bus signals and coded acknowledge signals, said interrupt means being responsive to said coded acknowledge signals for generating second coded interrupt signals indicating the next highest priority of said plurality of signal conditioner means requiring service;
microengine means coupled to said microprocessor means and responsive to said plurality of bus signals for generating a sequence of address signals, said highest priority of said plurality of signal conditioner means being responsive to said sequence of address signals for generating a sequence of said digitized data words, each of said sequence of said digitized data words being representative of the sampled value of said each of said analog signals;
first in-first out buffer means coupled to said plurality of signal conditioner means for receiving said sequence of said digitized data words and generating data word signals;
direct memory access controller means coupled to said first in-first out means for receiving said data word signals, and generating memory address signals and an address strobe signal;
first bus controller means coupled to said direct memory access controller means and responsive to said address strobe signal for generating a request signal; and
memory means coupled to said first bus controller means and responsive to said request signal for generating a grant signal; and
bus means coupling said direct memory access controller means and said memory means, said first bus controller means being responsive to said grant signal for enabling said memory address signals and said data word signals to be transferred to said memory means.

2. A data acquisition system comprising:
timing means for generating a plurality of timing signals;
a plurality of signal conditioner means coupled to said timing means, each of said plurality of signal conditioner means receiving a plurality of analog signals and being responsive to one of said plurality of timing signals for sampling each of said plurality of analog signals at the rate determined by said one of said plurality of timing signals and generating digitized data words representative of the sampled value of said each of said analog signals;
interrupt means coupled to said timing means and responsive to said timing signals for generating first coded interrupt signals indicating a highest priority of said plurality of signal conditioner means requiring service;
microprocessor means coupled to said interrupt means and responsive to said first coded interrupt signals for generating a plurality of bus signals and coded acknowledge signals, said interrupt means being responsive to said coded acknowledge signals for generating second coded interrupt signals indicating the next highest priority of said plurality of signal conditioner means requiring service;
microengine means coupled to said microprocessor means and responsive to said plurality of bus signals for generating a sequence of address signals, said highest priority of said plurality of signal conditioner means being responsive to said sequence of address signals for generating a sequence of said digitized data words, each of said sequence of said digitized data words being representative of the sampled value of said each of said analog signals;
first in-first out buffer means coupled to said plurality of signal conditioner means for receiving said sequence of said digitized data words and generating data word signals;
direct memory access controller means coupled to said first in-first out means for receiving said data word signals, and generating memory address signals and an address strobe signal;
first bus controller means coupled to said direct memory access controller means and responsive to said address strobe signal for generating a request signal; and
memory means coupled to said first bus controller means and responsive to said request signal for generating a grant signal, bus means coupling said direct memory access controller means and said memory means, said first bus controller means being responsive to said first grant signal for enabling said first memory address signals and said first data word signals to be transferred to said memory means;
said microprocessor means being responsive to said second coded interrupt signals for interrupting said microengine means and generating a second sequence of address signals, a selected one of said plurality of signal conditioners being responsive to said second sequence of address signals for generating a second sequence of said digitized data words, each being representative of said each of said analog values, said direct memory access controller means generating second memory address signals and a second address strobe signal; and
second bus controller means coupled to said microprocessor means and responsive to said second address strobe signal for generating a second request signal;
said memory means coupled to said second bus controller means and responsive to said second request signal for generating a second grant signal, said second bus controller means being responsive to said second grant signal for enabling said second memory address signals and said data word signals for transfer to said memory means

* * * * *